United States Patent [19]

Savins

[11] 4,181,178

[45] Jan. 1, 1980

[54] OIL RECOVERY BY WATERFLOODING WITH THICKENED SURFACTANT SOLUTIONS

[75] Inventor: Joseph G. Savins, Dallas, Tex.

[73] Assignee: Mobil Oil Corporation, New York, N.Y.

[21] Appl. No.: 859,626

[22] Filed: Dec. 12, 1977

[51] Int. Cl.$^2$ ............................................. E21B 43/22
[52] U.S. Cl. ............................. 166/274; 252/8.55 D
[58] Field of Search ..................... 252/8.55 D, 8.55 R; 166/274

[56] References Cited

U.S. PATENT DOCUMENTS

| | | | |
|---|---|---|---|
| 3,827,497 | 8/1974 | Dycus et al. | 166/274 |
| 3,888,308 | 6/1975 | Gale et al. | 166/273 |
| 3,977,471 | 8/1976 | Gale et al. | 252/8.55 X |
| 4,018,278 | 4/1977 | Shupe | 166/252 |
| 4,042,030 | 8/1977 | Savins et al. | 166/273 |
| 4,077,471 | 3/1978 | Shupe et al. | 252/8.55 X |

Primary Examiner—Herbert B. Guynn
Attorney, Agent, or Firm—C. A. Huggett; William D. Jackson

[57] ABSTRACT

Waterflooding process for the recovery of oil for a subterranean formation in which at least a portion of the injected water is thickened by the addition of a sulfonated polyethoxylated aliphatic alcohol surfactant. The thickened water has a salinity within the range of 5–18 percent. The sulfonated polyethoxylated aliphatic alcohol has at least two ethylene oxide units to provide an HLB within the range of 10.0–14.0 and the lipophilic base contains from 16 to 20 carbon atoms. The thickened surfactant slug may be preceded by the injection of a relatively low viscosity surfactant slug and viscosity gradation of the thickened surfactant slug may be accomplished by varying the salinity and/or the concentration of the sulfonated polyethoxylated aliphatic alcohol.

13 Claims, 6 Drawing Figures

OIL RECOVERY BY WATERFLOODING WITH THICKENED SURFACTANT SOLUTIONS

BACKGROUND OF THE INVENTION

This invention relates to the recovery of oil from subterranean oil reservoirs and more particularly to improved waterflooding operations involving the injection into a high temperature reservoir of a viscous aqueous liquid formulated through the use of an ether-linked sulfonate surfactant under controlled conditions of salinity.

In the recovery of oil from oil-bearing reservoirs, it usually is possible to recover only minor portions of the original oil in place by the so-called primary recovery methods which utilize only the natural forces present in the reservoir. Thus, a variety of supplemental recovery techniques has been employed in order to increase the recovery of oil from subterranean reservoirs. The most widely used supplemental recovery technique is waterflooding which involves the injection of water into the reservoir. As the water moves through the reservoir, it acts to displace oil therein to a production system composed of one or more wells through which the oil is recovered.

Various chemical additives may be employed in the injected water. For example, the injected water may contain surface-active agents which effect a reduction in the oil-water interfacial tension, thus enhancing the microscopic displacement of the oil by the water. Another widely used technique involves the addition of thickening agents which increase the viscosity of the injected water, normally to a value at least equal to that of the reservoir oil, in order to arrive at a favorable mobility ratio between the oil and water in order to increase the macroscopic displacement efficiency of the waterflood. Typically such viscosifiers or mobility control agents have taken the form of biopolymers such as the bacterial biopolymer available from the Kelco Company under the trade name "Kelzan" or synthetic polymers such as the partially hydrolyzed polyacrylamides available from the Dow Chemical Company under the trade name "Pusher" chemicals.

An alternative to the use of polymeric thickening agents involves the injection of a thickened aqueous surfactant solution as disclosed in U.S. Pat. No. 4,042,030 to Savins et al. In this process, at least a portion of the injected water is thickened through the use of an alkylaryl sulfonate in combination with a $C_4-C_6$ aliphatic alcohol having a hydrocarbon chain length of at least 3 carbon atoms. The action of the surfactant-alcohol system in increasing the viscosity of the water varies with the salinity of the water and the relative concentrations of the sulfonate surfactant and the alcohol. The thickened aqueous liquid exhibits a monovalent salt salinity within the range of 0.5-3.0 weight percent and has a surfactant concentration within the range of 0.5-4.0 weight percent. The alcohol is present in a concentration such that the ratio of the surfactant to the sum of the amount of the surfactant and alcohol is within the range of 0.3-0.8. The thickened aqueous solution of surfactant and alcohol may be preceded by a relatively low viscosity surfactant slug.

Thus far the surfactants used predominantly in decreasing the oil-water interfacial tension have been petroleum sulfonates and synthetic alkyl or alkylaryl sulfonates. While these surfactants are extremely effective in reducing the interfacial tension to desired low values within the millidyne per centimeter range, their usefulness is limited since they lack stability in the so-called "high brine" environments. These surfactants tend to precipitate in the presence of monovalent salts such as sodium chlorides at concentrations in excess of about 2 to 3 weight percent and in the presence of divalent metal ions such as calcium and magnesium ions at concentrations of about 50 to 100 parts per million and above.

In view of the limitations thus imposed on the use of the petroleum sulfonate type surfactants, various ether-linked anionic surfactants which are stable in high brine environments have been proposed for use in surfactant waterflooding. Thus, U.S. Pat. No. 3,827,497 to Dycus et al. discloses a surfactant waterflooding process in which a sulfonated oxyalkylated alcohol is employed in conjunction with a petroleum sulfonate or in which a sulfonated or sulfated oxyalkylated alcohol is employed in conjunction with a petroleum sulfonate and a polyalkylene glycol alkyl ether. The ether linkage is usually derived from ethylene oxide and preferably contains from 2 to 8 alkoxy units. The alcohol portion of the ether-linked sulfonate is usually derived from aliphatic alcohols containing 8–20 carbon atoms but may be derived from other alcohols including alkyl phenols containing 5–20 carbon atoms per alkyl group. The brine in which the surfactant systems of Dycus et al. are employed will usually contain 0.5–8 percent sodium chloride and brines under about 6 percent sodium chloride are said to be most suitable. The brine will often contain 50–5,000 ppm polyvalent metal ions such as calcium and/or magnesium.

U.S. Pat. No. 3,977,471 to Gale et al. discloses surfactant waterflooding employing certain alkylaryl ether-linked sulfonates which are said to effectively reduce the oil-water interfacial tension in a high temperature reservoir and in a high salinity environment. The alkylaryl lipophilic base is benzene, toluene, or xylene substituted with an alkyl group containing from 6 to 24 carbon atoms. The ether linkage is derived from ethylene oxide or propylene oxide and contains from 1 to 20 alkylene oxide units. The surfactants disclosed in Gale et al. are said to be particularly useful in reservoirs having high salinity brine (i.e., salinities of 2% or more) and have good tolerance to high salinity. For example, dodecyl dimethyl benzene ether $(EO)_4$ propane sulfonate is said to exhibit a high degree of surface activity with oil and water in saline solutions containing from 7 to 14 percent by weight sodium chloride. In addition to the use of the ether-linked sulfonates in aqueous solutions, the patentees disclose that they may be used in liquid hydrocarbon solvents or in microemulsions. Specifically disclosed are microemulsion systems composed of 91 to 93 percent water containing 6 percent sodium chloride, 5 percent oil, 1 to 3 percent dodecyl dimethyl benzene ether $(EO)_{4.2}$ propane sulfonate, and 1 percent butyl alcohol. The microemulsion is followed by a brine solution containing the biopolymer Kelzan as a thickening agent.

Another surfactant waterflooding process involving the use of brine-tolerant ether-linked sulfonates is disclosed in U.S. Pat. No. 4,018,278 to Shupe. The surfactants employed in Shupe include sulfonated ethoxylated aliphatic alcohols and alkyl phenols and are said to be usable in formations having temperatures in excess of 120° F. The alkyl chain in the alkyl or alkylaryl radical has from 8 to 20 carbon atoms and the ether linkage contains from 1 to 20 ethylene oxide units. The patentee claims the use of the surfactant in a solution having a salinity of at least about 6.0 percent by weight and discloses the use of sulfonated polyethoxylated dodecyl phenol in a core displacement test in a solution having a salinity of 183,000 ppm and a total hardness of 9400 ppm. Shupe also describes a field example involving the injection of a surfactant solution in a formation having a temperature of 240° F. and containing water having a salinity of approximately 205 kilograms per cubic meter and approximately 6,000 ppm calcium. In the field example, a 10 percent pore volume slug of surfactant solution is injected and followed by an aqueous solution of 0.5 percent by weight polysaccharide to achieve a favorable mobility ratio.

SUMMARY OF THE INVENTION

In accordance with the present invention, there is provided a new and improved waterflooding process in which at least a portion of the injected fluid is an aqueous liquid which is thickened by employing an ether-linked sulfonate surfactant under prescribed conditions of temperature and salinity. The invention is carried out in a subterranean oil reservoir penetrated by a spaced injection and production system. The reservoir exhibits a temperature of at least 90° F. The viscous aqueous liquid introduced into the reservoir through the injection system has a salinity within the range of 5–18 weight percent and contains a water-soluble sulfonated polyethoxylated aliphatic alcohol. The lipophilic base of the surfactant has a hydrocarbon chain length of from 16 to 20 carbon atoms. The surfactant has an HLB number within the range of 10.0–14.0 and the ether linkage contains at least 2 ethylene oxide units. A preferred application of the invention is in reservoirs having a formation temperature within the range of 100°–175° F. In a further embodiment of the invention, the injection of the viscous aqueous liquid is preceded by the injection in the reservoir of a low viscosity aqueous surfactant solution having a viscosity less than that of the reservoir oil.

DESCRIPTION OF SPECIFIC EMBODIMENTS

Figure 1:
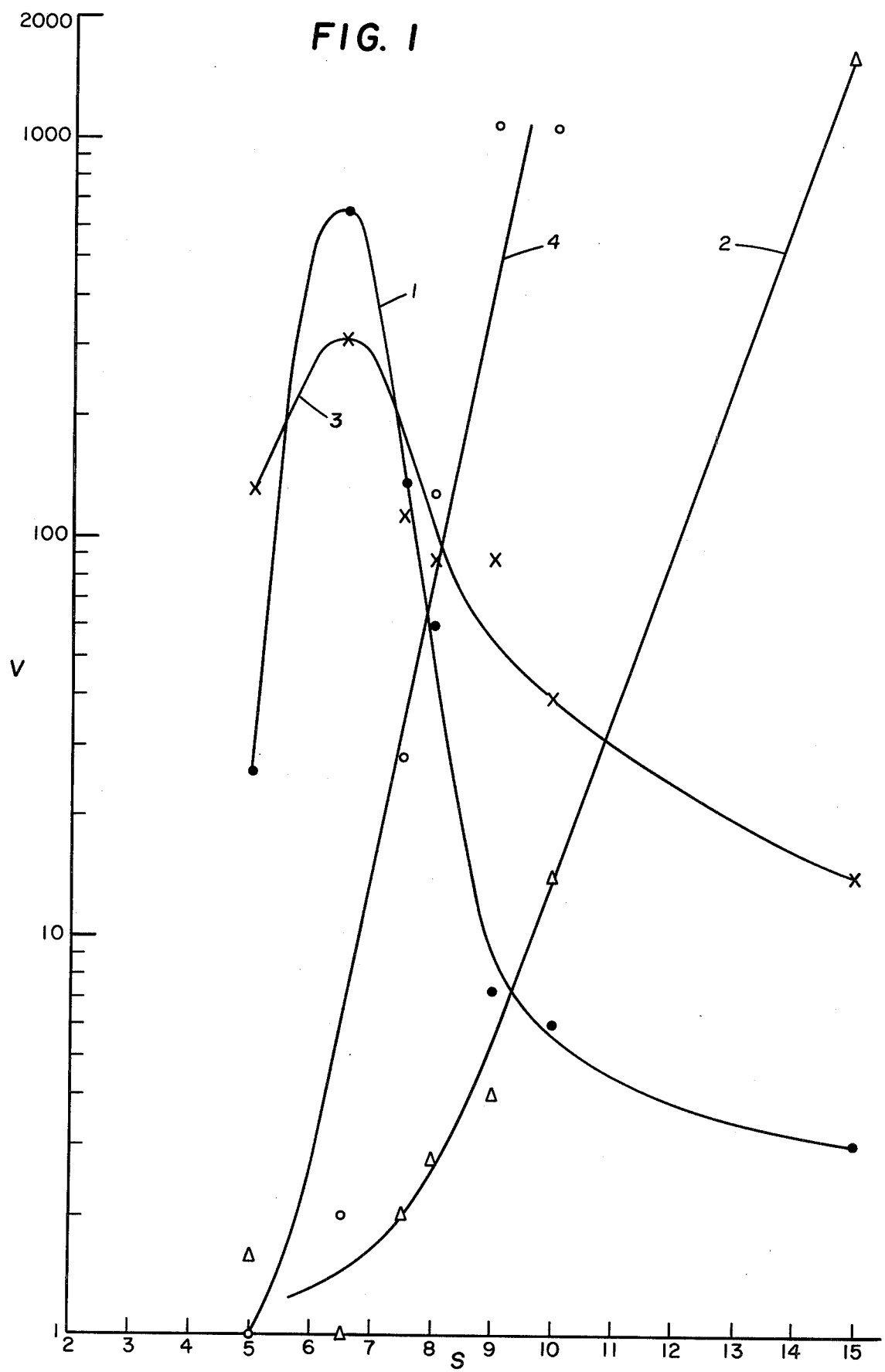
FIGS. 1 and 2 are graphs illustrating the viscosities of aqueous solutions of a number of ether-linked sulfonate surfactants as a function of the solution salinities.

The present invention results from the discovery that certain ether-linked sulfonate surfactants act as viscosifiers for waterflood mobility control applications under certain conditions of salinity and reservoir temperature. The ether-linked sulfonate is employed in a brine having a salinity within the range of 5–18 weight percent. Within this salinity range a significant thickening effect may be achieved and the salinity may be varied within this range to arrive at a value at which maximum thickening occurs. The thickening effect of the surfactant systems is also temperature dependent and the present invention is carried out at a reservoir temperature of at least 90° F.

The ether-linked sulfonates employed in carrying out the present invention are sulfonated ethoxylated aliphatic alcohols characterized by an HLB (hydrophilic-lipophilic balance) within the range of 10.0–14.0 and wherein the aliphatic hydrocarbon group forming the lipophilic base of the surfactant contains from 16 to 20 carbon atoms. The HLB is defined in accordance with the relationship $$HLB = 7 + \Sigma \text{ (hydrophilic group numbers)} - \Sigma \text{ (lipophilic group numbers)}$$

as described in Becher, Paul, EMULSIONS: THEORY AND PRACTICE, Second Edition, Reinhold Publishing Corporation, New York, USA, pp. 241–243. The sulfonate group is assigned a group number of 11.0 and the remaining group numbers are as set forth on page 242 of Becher. The ether linkage between the lipophilic base and the anionic sulfonate group contains 2 or more ethylene oxide units. The number of ethylene oxide units will vary depending upon the nature of the lipophilic base to provide an HLB number within the aforementioned range of 10.0–14.0. Preferably the aliphatic group providing the lipophilic surfactant base contains from 16 to 18 carbon atoms and the surfactant has an HLB within the range of 10.0–12.0.

The ether-linked sulfonates employed in the present invention can be prepared by ethoxylation of the appropriate aliphatic alcohol and subsequent sulfonation. Suitable sulfonation procedures are well known in the art and include chlorination or sulfation followed by reaction with sodium sulfite as disclosed in the aforementioned patent to Shupe, or reaction of a metal etherate with a sulfonate such as chloromethane sulfonate or a sultone such as propane sultone or butane sultone as disclosed in the patent to Gale et al. As a practical matter, it is preferred to employ propane sultone since sulfonation with this agent is readily carried out under moderate temperature conditions as disclosed by Fischer, R. F., "Propane Sultone," Industrial and Engineering Chemistry, Vol. 56, No. 3, March 1964, pp. 41–45. Accordingly, the sulfonated polyethoxylated aliphatic alcohols employed in the present invention may be characterized by the formula:

$$R(OC_2H_4)_nOC_3H_6SO_3^-M^+ \qquad (1)$$

wherein
R is an aliphatic hydrocarbon group containing from 16 to 20 carbon atoms,
n is at least 2, and
M is an alkali metal, ammonium, or substituted ammonium ion.

Where M is an alkali metal ion, it usually will take the form of sodium or potassium. Substituted ammonium ions which may be employed include mono-, di-, or tri-substituted alkylammonium or alkanolammonium ions. Examples of alkylammonium ions include methylammonium, ethylammonium, and normal or isopropylammonium ions and examples of alkanolammonium ions include monoethanolammonium and triethanolammonium ions.

Experimental work relative to the present invention was carried out with a number of sodium salts of sulfonated polyethoxylated aliphatic alcohols characterized by formula (1) and identified below as surfactants S-1 through S-7. For surfactants S-1 and S-2, R was a hexadecyl group and n had a value of 2 and 3, respectively, to provide HLB numbers of 10.9 and 11.3. Surfactants S-3 and S-4 were octadecyl polyethoxylated propane sulfonates having HLB numbers of 10.0 and 10.7, respectively. Surfactant S-3 contained about 2 ethylene oxide units and surfactant S-4 about 4 ethylene oxide units. In each of surfactants S-5 through S-7, R was a mixture of alkyl groups containing from about 12 to 18 carbon atoms with an average alkyl chain length of about 16 carbon atoms. For surfactant S-5, n had a value of about 3 to provide an HLB of 11.3. Surfactants S-6 and S-7 contained about 2 and 4 ethylene oxide units, respectively, to provide HLB numbers of 10.9 and 11.6.

TABLE I

| Salinity % | Viscosity, cp. | | | | | | |
|---|---|---|---|---|---|---|---|
| | S-1 | S-2 | S-3 | S-4 | S-5 | S-6 | S-7 |
| 5 | 26.4 | 1.6 | 84–230 | 1.0 | 25 | 32 | 1.6 |
| 6.5 | 660 | 1.0 | 131–312 | 2.0 | 1450 | 700 | 4.8 |
| 7.5 | 136 | 2.0 | 125–114 | 28 | 640 | 1150 | 15 |
| 8 | 60 | 2.8 | 208–88 | 128 | 159 | 1225 | 41 |
| 9 | 7.2 | 4.0 | 164–88 | 1100 | 58 | 738 | 298 |
| 10 | 6.0 | 14.0 | 150–40 | 1060 | 9 | 158 | 950 |
| 15 | 3.0 | 1650 | 82–14 | gel | 2 | 3 | 4 |

In one suite of experiments, viscosities were determined for aqueous solutions of the surfactants S-1 through S-7 where the salinities of the solutions, as provided by sodium chloride, were varied between 5 and 15 weight percent. The results are set forth in Table I in which the first column gives the surfactant solution salinity and the remaining columns the viscosities in centipoises as measured for the solutions containing the surfactants S-1 through S-7. In each case the surfactant was present in a concentration of 1.5 weight percent. The viscosity measurements were taken at a temperature of 128° F. with a Brookfield viscometer at a nominal shear rate of 1.7 sec$^{-1}$. The surfactant solutions were aged for about 1 day at 128° F. prior to taking the viscosity measurements. For the surfactant S-3, solution viscosities were measured twice with an interval between viscosity measurements of about 15 minutes. Both viscosity measurements are shown and the data would appear to indicate that the surfactant solution had not yet equilibrated when the viscosity measurements were taken. It is also noted that the solutions of the surfactant S-3 appeared to form two phases. The remaining surfactants formed optically clear single phase solutions throughout at least part of the salinity range over which the measurements were taken. Thus, the solutions of surfactant S-4 were optically clear throughout the range of 5 to 15 percent. Surfactants S-2 and S-5 formed optically clear solutions at salinity values of 5 to 7.5 percent and appeared to form two phases at higher salinity values. The solution characteristics of the remaining surfactants varied between those of surfactant S-4 and surfactants S-2 and S-5.

Figure 2:
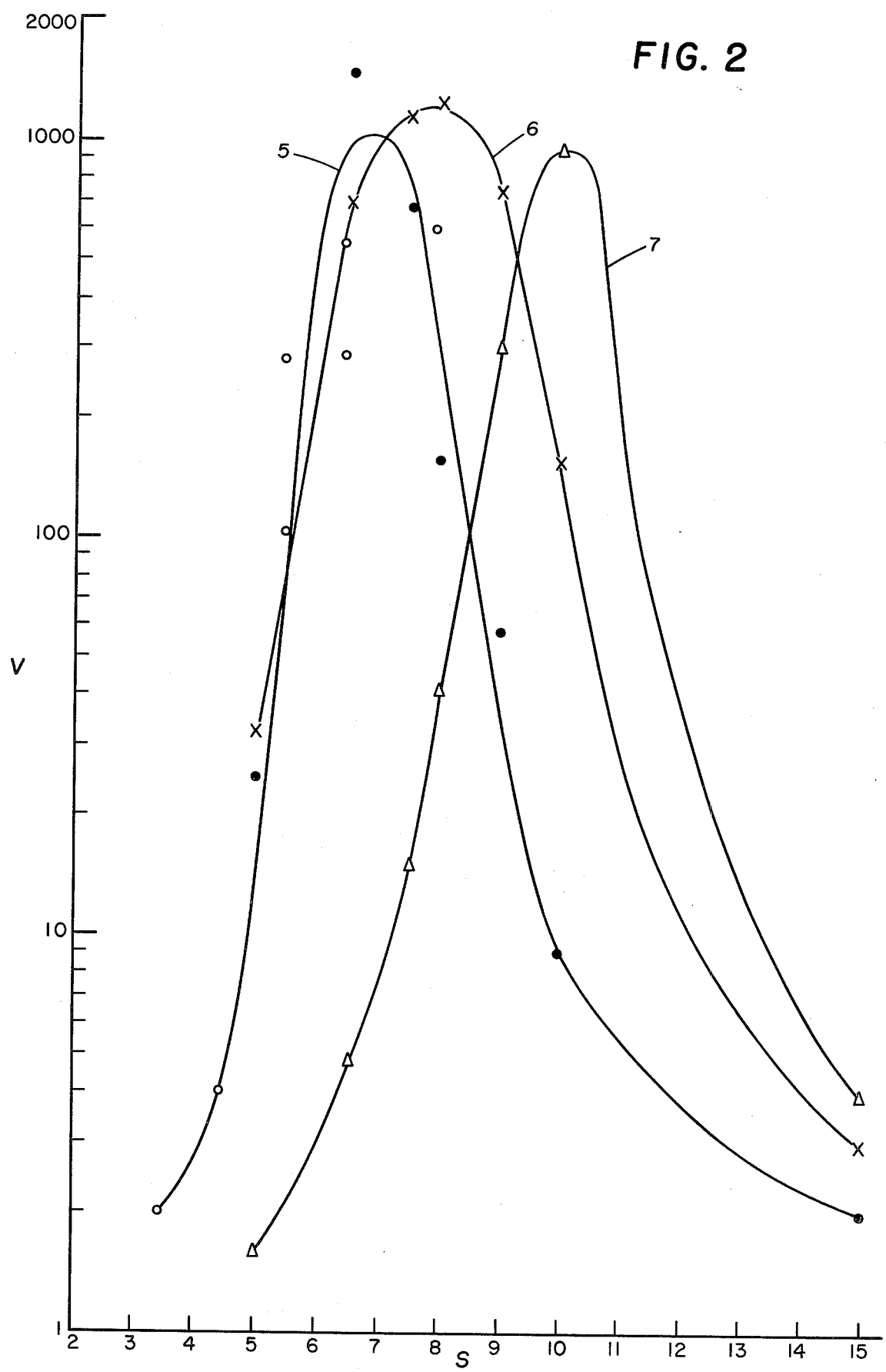

Turning now to the drawings, the data given in Table I are presented in FIGS. 1 and 2 wherein the curves shown are graphs of the log of the viscosity, V, in centipoises, plotted on the ordinate versus the solution salinity, S, in weight percent, plotted on the abscissa. The viscosity measurements for surfactants S-1 through S-4 are shown in FIG. 1 by curves 1 through 4, respectively, and for surfactants S-5 through S-7 in FIG. 2 by curves 5 through 7, respectively. With respect to curve 3 in FIG. 1, the data points shown are those obtained by the viscosity measurements taken at the second time interval shown in Table I. With respect to curve 5 in FIG. 2, the data points indicated by the legend O are not set forth in Table I. These viscosity measurements were obtained for a 1.5 weight percent concentration of surfactant S-5 in aqueous solutions containing 0.2 weight percent each of sodium carbonate and sodium tripolyphosphate plus sufficient sodium chloride to provide the salinity indicated.

Experiments similar to those described above were carried out employing a hydrocarbyl polyethoxy 2-hydroxypropane sulfonate (sodium salt) identified herein as surfactant S-8. For this surfactant, the lipophilic group corresponding to the group R in formula (1) was a mixture of alkyl groups containing from about 12 to 16 carbon atoms with an average alkyl chain length of about 14 carbon atoms. Surfactant S-8 contained about 3 units of ethylene oxide to provide an HLB of 14.1. In the experimental work carried out with this surfactant, a concentration of 1.5 weight percent showed no thickening effect at salinities within the range of 5–10 weight percent. At a salinity of 15 percent, the viscosity of the surfactant solution was about 9 centipoises. This may be contrasted with the results shown in FIGS. 1 and 2 wherein the surfactants S-1 through S-7 produced in each case maximum viscosities well in excess of 100 centipoises at salinities ranging from 5–15 percent. The curves shown in FIGS. 1 and 2 also indicate that mixtures of the ether-linked sulfonates can be employed in order to arrive at an optimum thickening effect for a given salinity. The mixture of equal parts of surfactants S-1 and S-3 to provide a total surfactant concentration of 1.5 weight percent in a 5 percent brine produced viscosities within the range of 500 to 600 centipoises, well above those obtained by either component individually.

A limited number of viscosity measurements were taken for solutions of the surfactants S-1 through S-7 in mixed brines containing divalent metal ions. In one series of experiments, each surfactant was dissolved in a brine containing 6.2 weight percent sodium chloride, 1160 ppm calcium ions, 250 ppm magnesium ions and 90 ppm barium ions in the form of the chloride salts to provide a total salinity of about 6.6 weight percent. Surfactant S-5 was employed in a concentration of 1.4 weight percent and the remaining surfactants in a concentration of 1.5 weight percent. The viscosity measurements were taken at a temperature of 128° F. and a shear rate of 1.7 sec$^{-1}$ after aging for about 1 day at 128° F. The solutions of surfactants S-1, S-3, and S-4 exhibited viscosities of 92, 62, and 18 centipoises, respectively. The solution containing the surfactant S-2 had a viscosity of only 2 centipoises. However, it will be recalled from the data presented in FIG. 1 that the salinity of the solution was below that at which significant viscosity development occurs for the surfactant S-2. Surfactants S-5, S-6, and S-7 exhibited viscosities at about 156, 1100, and 17, respectively. An additional viscosity measurement was taken for a 1.5 percent solution of the surfactant S-5 in a mixed brine containing 3.9 weight percent sodium chloride, about 4820 ppm calcium ions and 1580 ppm magnesium ions in the form of the chloride salts to provide a total salinity of about 5.9 percent. The viscosity observed here was about 1000 centipoises at 128° F. and a shear rate of 1.8 sec$^{-1}$. From the foregoing data it can be seen that the surfactants employed in the present invention produce a thickening action action in the presence of divalent metal ions and in some cases the viscosity yield appears to be enhanced by the presence of the divalent metal ions.

Figure 3:
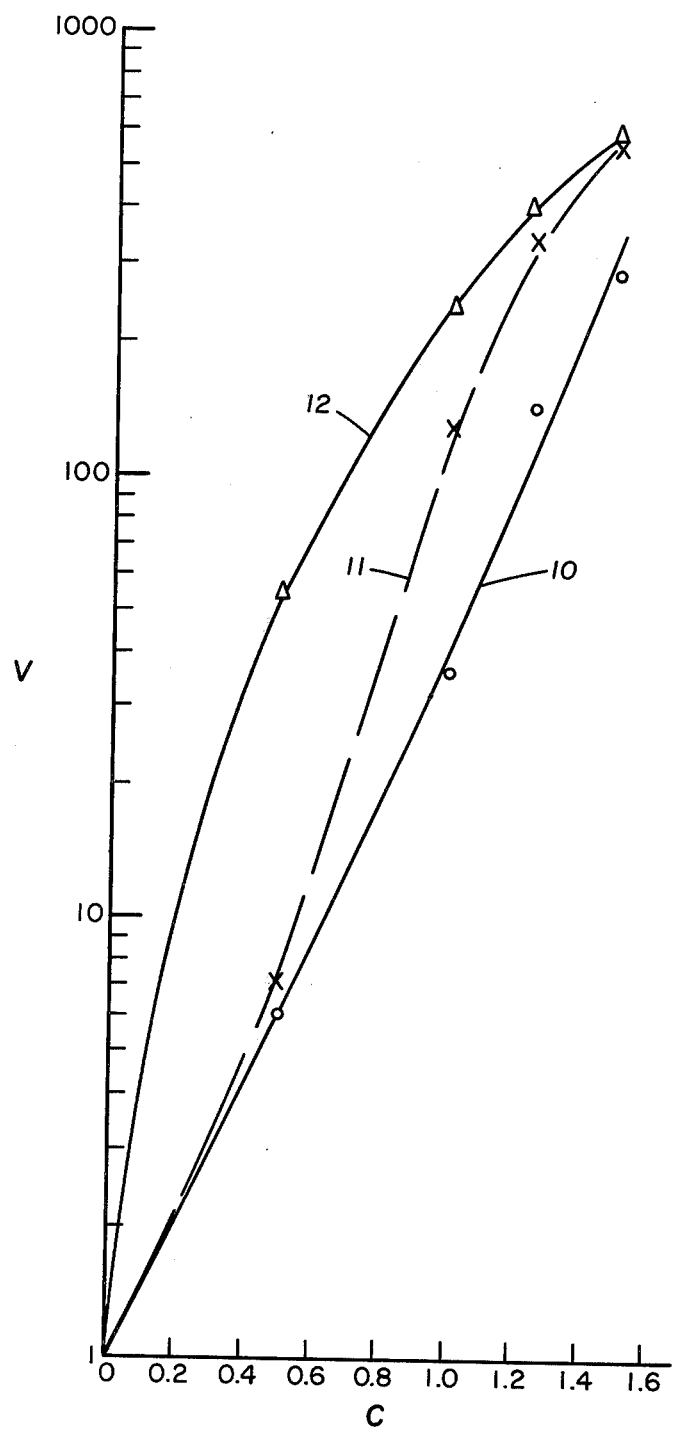
FIG. 3 is a graph illustrating the relationship between viscosity and surfactant concentration for aqueous solutions of an ether-linked sulfonate at different salinities.

Turning now to FIG. 3, curves 10, 11, and 12 are plots of the log of viscosity, V, in centipoises, on the ordinate versus the surfactant concentration, C, in weight percent on the abscissa for aqueous solutions of surfactant S-5 containing 5.0, 6.0, and 7.5 weight percent sodium chloride, respectively. The surfactant solutions also contained sodium carbonate and sodium tripolyphosphate in concentrations of 0.2 weight percent each to provide total salinities of 5.4, 6.4, and 7.9 weight percent. As can be seen in FIG. 3, the viscosities of the surfactant solutions increased exponentially with increasing surfactant concentration throughout the range measured. Extrapolation of curves 10, 11, and 12 to zero indicates that the presence of the surfactant in even small concentrations results in some viscosity increase.

The viscosities observed for different concentrations of the surfactant S-6 in the 6.6 percent mixed brine described previously are set forth in Table II. In Table II the surfactant concentration is set forth in column one. The second and third columns set forth the viscosity in centipoises as measured at shear rates of 1.7 and 6.9 sec$^{-1}$, respectively. The viscosity measurements were taken at 128° F. after aging of the surfactant solutions at that temperature for about two days.

The minimum surfactant concentration employed will depend upon the temperature and salinity conditions and of course the desired viscosity of the surfactant solution which, as noted previously, normally should be equal to or greater than that of the reservoir oil for effective mobility control. As a practical matter the surfactant normally should be present in a concentration of at least 0.1 weight percent and usually 0.2 weight percent. In most cases it will be preferred to employ the surfactant in a concentration of 0.5 weight percent or more. While the surfactant may be employed in any greater concentration up to the limit imposed by its solubility in the saline solution, there usually will be no incentive to employ a surfactant concentration greater than 1.5 weight percent. Thus, for most applications the surfactant will be employed in a concentration within the range of 0.5–1.5 weight percent.

TABLE II

| Conc. | Viscosity, cp. | |
|---|---|---|
| % | 1.7 sec$^{-1}$ | 6.9 sec$^{-1}$ |
| .1 | 1 | 1 |
| .25 | 21 | 9.2 |
| .5 | 109 | 31 |
| .75 | 259 | 76 |
| 1.0 | 385 | 122 |

TABLE II-continued

| Conc. | Viscosity, cp. | |
|---|---|---|
| % | 1.7 sec$^{-1}$ | 6.9 sec$^{-1}$ |
| 1.5 | 1100 | 315 |

Figure 4:
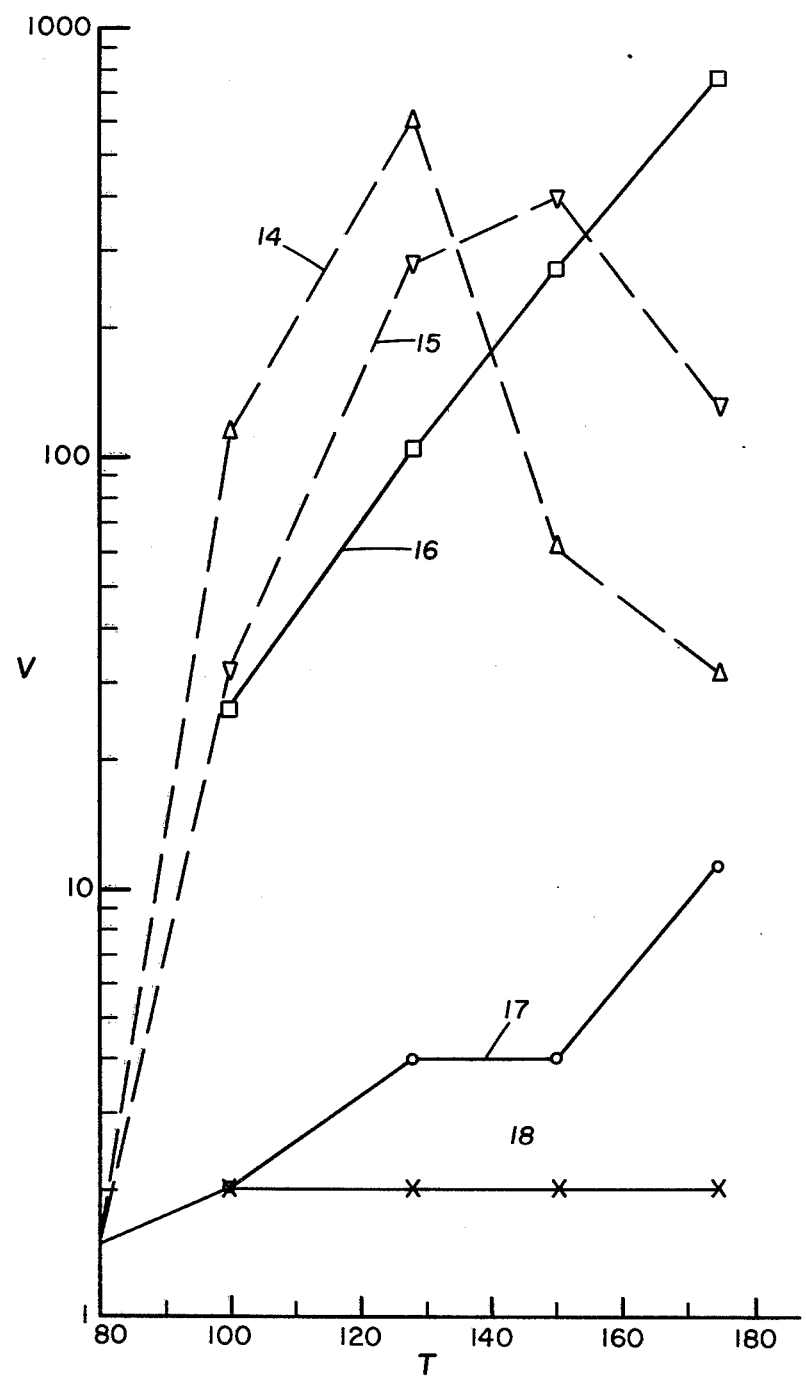
FIG. 4 is a graph illustrating the relationship between viscosity and temperature for aqueous solutions of an ether-linked sulfonate at different salinities.

FIG. 4 illustrates the effect of temperatures upon the viscosity of aqueous solutions of the surfactant S-5. In FIG. 4, the curves are plots of the log of the viscosity, V, in centipoises, of the surfactant solution on the ordinate. versus the temperature, T, in degrees Fahrenheit on the abscissa. Curves 14, 15, and 16 indicate the viscosities observes for surfactant solution salinities of 7.9, 6.4, and 5.4 weight percent, respectively, and curves 17 and 18 indicate the viscosities measured for surfactant solutions having salinities of 4.4 and 3.4 weight percent, respectively. The surfactant solutions contained 0.2 weight percent each of sodium carbonate and sodium tripolyphosphate plus sufficient sodium chloride to provide the salinities indicated. The surfactant concentration in each instance was 1.5 weight percent.

At 80° F., the surfactant produced little or no thickening effect regardless of the salinity. As indicated by curves 14, 15, and 16, at 100° F. a significant thickening effect was observed for the surfactant solution salinities of 5.4 through 7.9. By extrapolation between the data points attained at 100° F. and 80° F., it can be seen that the reservoir temperature should be at least 90° F. in order to attain the synergistic thickening effect of the ether-linked sulfonate. Preferably the invention is applied in reservoirs having temperatures of at least 100° F., particularly where the salinities are near the lower end of the aforementioned 5–18 percent range.

The surfactant solution viscosity depicted by curve 16 progressively increased with an increase in temperature throughout the measurement range whereas viscosity peaks were observed for the higher salinity systems with the temperature at which the maximum viscosity was observed decreasing as the salinity increased. In view of the data presented in FIG. 4, a preferred application of the invention is in reservoirs having temperatures within the range of 100°–175° F. By comparing this data with curve 5 of FIG. 2, it can be seen that the effect of increasing temperature is a lowering of the salinity at which the maximum viscosity yield is obtained. For example, for a temperature in excess of 175° F., the salinity of the surfactant solution should be somewhat lower than for a temperature of 128° F. in order to attain the maximum viscosity.

In further experimental work relative to the invention, aqueous solutions of the surfactant were aged at a temperature of 175° F. and the viscosity then measured at 175° F. and at 128° F. The aging experiments were carried out employing two surfactant solutions, one containing 6.2 weight percent sodium chloride and the other containing 7.5 weight percent sodium chloride. In each case, the surfactant was employed in a concentration of 0.5 weight percent and the viscosity measurements were taken at a shear rate of 1.7 sec$^{-1}$.

Figure 5:
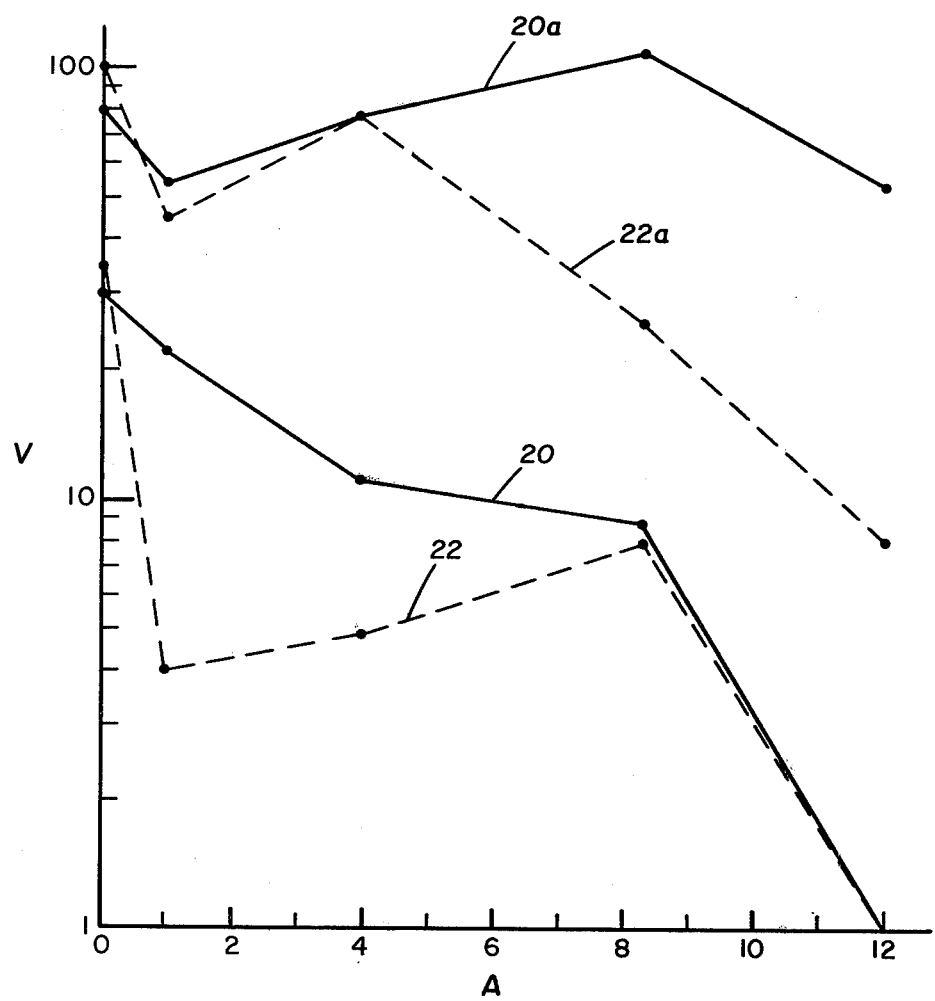
FIG. 5 is a graph illustrating the effect on viscosity of aging of aqueous solutions of ether-linked sulfonates at an elevated temperature.

Results of this experimental work are set forth in FIG. 5 which is a graph of the log of the viscosity, V, on the ordinate versus the aging time, A, in weeks, on the abscissa. Curve 20 indicates the viscosity measurements taken at 175° F. for the surfactant solution having a salinity of 6.2 weight percent and curve 22 indicates viscosity measurements taken at 175° F. for the surfactant solution having a salinity of 7.5 weight percent.

After measuring the viscosity of the aged sample at 175° F., the sample was then cooled to 128° F. and the viscosity measured at this temperature also. The viscosities observed at 128° F. for the 6.2 percent salinity and 7.5 percent salinity surfactant solutions are indicated by curves 20a and 22a, respectively. As can be seen from an examination of the data presented in FIG. 5, prolonged exposure of the surfactant solution at the elevated temperature of 175° F. resulted in degradation of the viscosity yield. However, this phenomenon appears to be at least partially reversible as evidenced by the viscosities observed after cooling of the surfactant solution to the lower temperature of 128° F. The data of FIG. 5 when considered with that of FIG. 4 indicates that the best vicosity yields over prolonged periods of time would occur at temperatures of about 100° to 140° F.

Figure 6:
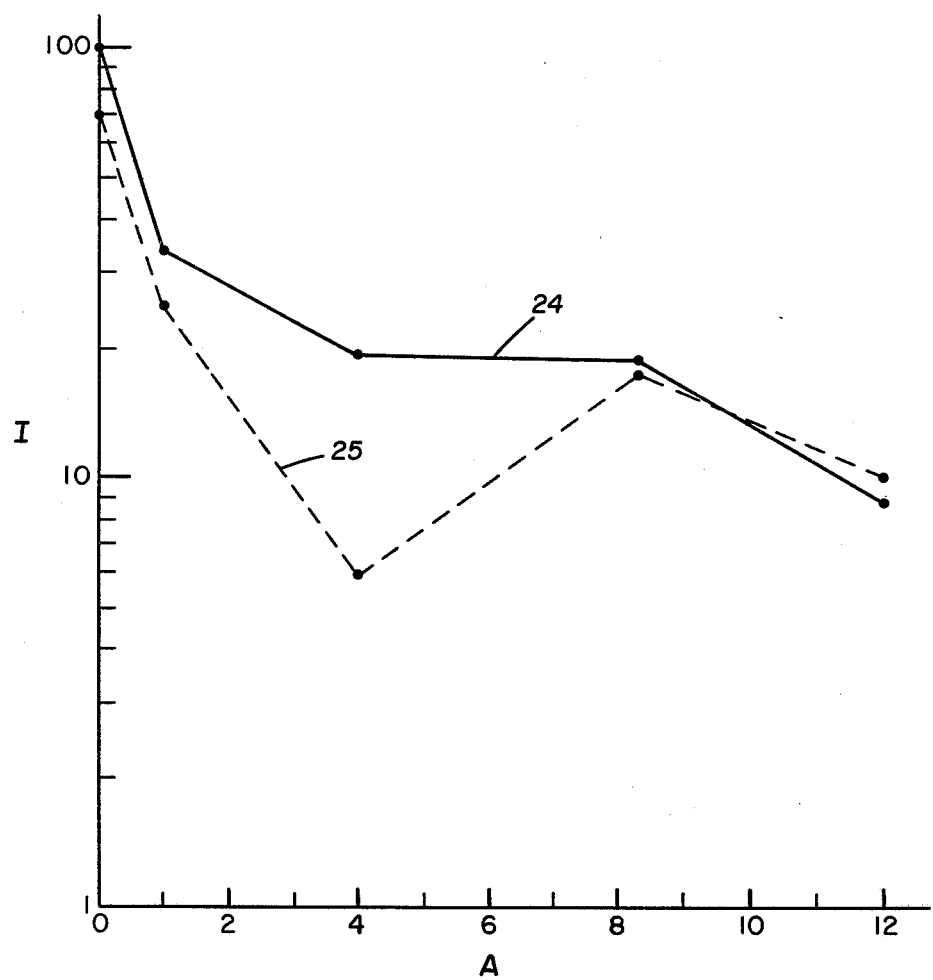
FIG. 6 is a graph illustrating the effect on oil-water interfacial tension of aging of aqueous solutions of ether-linked sulfonates at an elevated temperature.

Studies similar to those described above were carried out in order to determine the effect of aging of the surfactant solution on oil-water interfacial tension. In this set of experiments, surfactant solutions having salinities of 6.2 and 7.5 weight percent sodium chloride were aged at 175° F. and the interfacial tensions measured at 169° F. The interfacial tension measurements were taken against a crude oil employing the spinning drop method. The surfactant concentration was 1.5 weight percent. the results of these experiments are illustrated in FIG. 6 which is a graph of the log of the interfacial tension, I, in millidynes per centimeter, on the ordinate versus the aging time, A, in weeks on the abscissa. Curve 24 illustrates the interfacial tensions measured for the surfactant in the 6.2 weight percent brine and curve 25 the interfacial tensions for the surfactant in the 7.5 weight percent brine. As can be seen from examination of FIG. 5, aging of the surfactant solution appeared to have little deleterious effect on oil-water interfacial tension and in fact the interfacial tension appears generally to decrease with age.

As noted previously, the aforementioned patent to Savins et al. discloses the use of a thickened surfactant-alcohol slug in conjunction with a relatively low viscosity surfactant slug and in conjunction with viscosity gradation of the thickened surfactant-alcohol slug. Similar injection formats may be employed in carrying out the present invention. Thus, viscosity gradation of the trailing edge of the thickened slug containing the sulfonated polyethoxylated aliphatic alcohol may be accomplished by varying the surfactant concentration or the salinity. For example, as indicated by the data presented in FIG. 3, the viscosity of the rear portion of the surfactant slug can be progressively decreased by decreasing the surfactant concentration in increments until the solution viscosity is near that of the subsequently injected drive water. Similarly, viscosity gradation can be accomplished by varying the salinity either upwardly or downwardly from the salt concentration at which the maximum viscosity is attained. For example, with respect to the surfactant S-7, viscosity gradation can be accomplished by employing the surfactant in a solution having a salinity of about 10 percent where the maximum viscosity yield is achieved and then either decreasing or increasing the salinity from that value in the rear portion of the slug to attain a resultant decrease in viscosity yield. Usually it will be preferred to attain the decreasing viscosity gradation in the trailing edge of the surfactant slug by decreasing the salinity since this is consistent with chromatographic transportation of the surfactant through the reservoir.

It will be recognized that viscosity gradation can be achieved by varying both the surfactant concentration and the solution salinity. For example, the viscosity of the rear portion of the slug can be decreased by progressively decreasing both the salinity and the surfactant concentration. Similarly, viscosity gradation in the front portion of the thickened surfactant slug can be accomplished by adjusting one or both of the above-described parameters in a manner to progressively increase the viscosity of the surfactant solution from a value less than that of the reservoir oil to a greater value, normally 1 to 4 times the viscosity of the reservoir oil.

Since the sulfonated polyethoxylated aliphatic alcohols employed in the present invention produce low oil-water interfacial tensions, the thickened surfactant slug may be the sole surfactant slug employed in the oil recovery operation. That is, the sulfonated polyethoxylated aliphatic alcohol may be relied upon for both microscopic oil displacement and macroscopic oil displacement. However, in some cases it will be desired to precede the thickened surfactant slug with a more or less "conventional" surfactant slug which will produce extremely low oil-water interfacial tensions, e.g. on the order of 5 millidynes/centimeter or less, but which has a viscosity less than that of the reservoir oil. The surfactant employed in this relatively low viscosity surfactant slug may be of any type suitable for use in surfactant waterflooding to reduce the oil-water interfacial tension as discussed previously.

The present invention may be carried out utilizing injection and production systems as defined by any suitable arrangement of wells. One well arrangement commonly used in waterflooding operations and suitable for use in carrying out the present invention is an integrated five-spot pattern of the type illustrated in the aforementioned patent to Savins et al. Other well arrangements may be used in carrying out the present invention, examples of which are set forth in the Savins et al. patent. By the term "pore volume" as used herein is meant that volume of the portion of the formation underlying the well pattern employed as described in greater detail in the Savins et al. patent.

The thickened aqueous surfactant solution may be injected in any suitable amount depending upon the conditions encountered in a particular reservoir and the concentration of the ether-linked surfactant. The thickened aqueous surfactant solution usually will be injected in an amount of at least 0.1 pore volume to provide for effective mobility control. Usually the aqueous solution of the ether-linked sulfonate will be employed in an amount within the range of 0.1 to 0.5 pore volume. Where the thickened surfactant solution is preceded by the low viscosity surfactant slug, the low viscosity surfactant slug usually will be injected in an amount within the range of 0.05 to 0.2 pore volume. Subsequent to the injection of the thickened surfactant slug, an aqueous driving fluid is then injected through the injection system to displace the fluids through the reservoir to the production system. The driving fluid may be any water which is locally available and not incompatible with the formation and may be injected in such amounts as is necessary to carry the process to its completion.

I claim:

1. In a method for the recovery of oil from a subterranean oil reservoir having a temperature of at least 90° F. and penetrated by spaced injection and production systems wherein an aqueous fluid is introduced into said reservoir via said injection system to displace oil to said production system, the improvement comprising:

employing as at least a portion of the fluid introduced into said injection system an aqueous solution of a surfactant having a viscosity less than that of the reservoir oil and thereafter a thickened aqueous liquid having a salinity within the range of 5–18 weight percent and containing a water-soluble sulfonated polyethoxylated aliphatic alcohol which increases the viscosity of said aqueous liquid to a value equal to or greater than the viscosity of the reservoir oil, said sulfonated polyethoxylated aliphatic alcohol having an HLB within the range of 10.0–14.0 and being characterized by the formula:

$$R(OC_2H_4)_nOC_3H_6SO_3^-M^+$$

wherein

R is an aliphatic hydrocarbon group containing from 16 to 20 carbon atoms, n is at least 2, and M is an alkali metal, ammonium, or substituted ammonium ion.

2. The method of claim 1 wherein said aqueous liquid contains said sulfonated polyethoxylated aliphatic alcohol in a concentration of at least 0.1 weight percent.

3. The method of claim 1 wherein said aqueous liquid contains said sulfonated polyethoxylated aliphatic alcohol in a concentration of at least 0.5 weight percent.

4. The method of claim 1 wherein said aqueous liquid contains said sulfonated polyethoxylated aliphatic alcohol in a concentration of 0.5–1.5 weight percent.

5. The method of claim 1 wherein said reservoir temperature is within the range of 100°–175° F.

6. The method of claim 1 wherein said reservoir has a temperature within the range of 100°–140° F.

7. The method of claim 1 wherein said sulfonated polyethoxylated aliphatic alcohol has an HLB within the range of 10.0–12.0.

8. The method of claim 7 wherein R contains from 16 to 18 carbon atoms.

9. The method of claim 1 wherein said thickened aqueous liquid contains a mixture of sulfonated polyethoxylated aliphatic alcohols characterized by the formula of claim 1.

10. The method of claim 9 wherein said sulfonated polyethoxylated aliphatic alcohols have an HLB within the range of 10.0–12.0.

11. In a method for the recovery of oil from a subterranean oil reservoir having a temperature of at least 90° F. and penetrated by spaced injection and production systems wherein an aqueous fluid is introduced into said reservoir via said injection system to displace oil to said production system, the improvement comprising:

employing as at least a portion of the fluid introduced into said injection system a thickened aqueous liquid having a salinity within the range of 5–18 weight percent and containing a water-soluble sulfonated polyethoxylated aliphatic alcohol which increases the viscosity of said aqueous liquid to a value equal to or greater than the viscosity of the reservoir oil, said sulfonated polyethoxylated aliphatic alcohol having an HLB within the range of 10.0–14.0 and being characterized by the formula:

$$R(OC_2H_4)_nOC_3H_6SO_3^-M^+$$

wherein

R is an aliphatic hydrocarbon group containing from 16 to 20 carbon atoms, n is at least 2, and M is an alkali metal, ammonium, or substituted ammonium ion, and progressively decreasing the viscosity of a rear portion of said thickened aqueous liquid by varying at least one of the salinity or the concentration of said sulfonated polyethoxylated aliphatic alcohol.

12. The method of claim 11 wherein the viscosity of said rear portion is decreased by decreasing the salinity.

13. The method of claim 11 wherein the viscosity of said rear portion is decreased by decreasing the concentration of said sulfonated polyethoxylated aliphatic alcohol.

* * * * *